United States Patent [19]

Bragin et al.

[11] Patent Number: 4,505,452
[45] Date of Patent: Mar. 19, 1985

[54] GATE VALVE

[76] Inventors: Boris F. Bragin, Kvartal 50 let Oktyabrya, 52, kv. 60; Jury B. Korotkikh, ulitsa Lenina, 103, kv. 53; Felix D. Markuntovich, 10 mikroraion, 5, kv. 39, all of Voroshilovgrad; Evgeny P. Olofinsky, prospekt Mira, 194, kv. 58, Moscow, all of U.S.S.R.

[21] Appl. No.: 570,370
[22] Filed: Jan. 13, 1984
[51] Int. Cl.³ .................... F16K 3/314; F16K 3/00
[52] U.S. Cl. ........................................... 251/326
[58] Field of Search ............... 251/326, 327, 328, 329

[56] References Cited

U.S. PATENT DOCUMENTS

| 3,026,084 | 3/1962 | Bryant | 251/327 X |
| 3,188,049 | 6/1965 | Zawacki et al. | 251/327 |
| 3,347,261 | 10/1967 | Yancey | 251/328 X |
| 3,533,598 | 10/1970 | Tillman | 251/328 X |
| 4,230,299 | 10/1980 | Pierce | 251/326 X |
| 4,281,819 | 8/1981 | Linder | 251/328 |

Primary Examiner—Robert G. Nilson
Assistant Examiner—John S. Starsiak, Jr.
Attorney, Agent, or Firm—Holman & Stern

[57] ABSTRACT

A gate valve for a pipeline has a housing with butt pipes which define a passage with the pipeline and a gate having a hole and engageable with a butt pipe for shutting-off the passage. The gate is connected at its ends to ends of drive rods accommodated in the housing. The gate and each of the rods have equal areas taken in cross-sections perpendicular to the axis of the rods. The ends of the gate and the ends of the rods connected thereto have shaped end faces facing toward each other and designed for the passage inside the housing of solid particles of a fluid being conveyed during reciprocations of the gate from a space partially occupied by the gate to a space being left by the rod adjacent thereto, and also from a space occupied by the other of the rods to a space being left by the part of the gate adjacent thereto.

2 Claims, 6 Drawing Figures

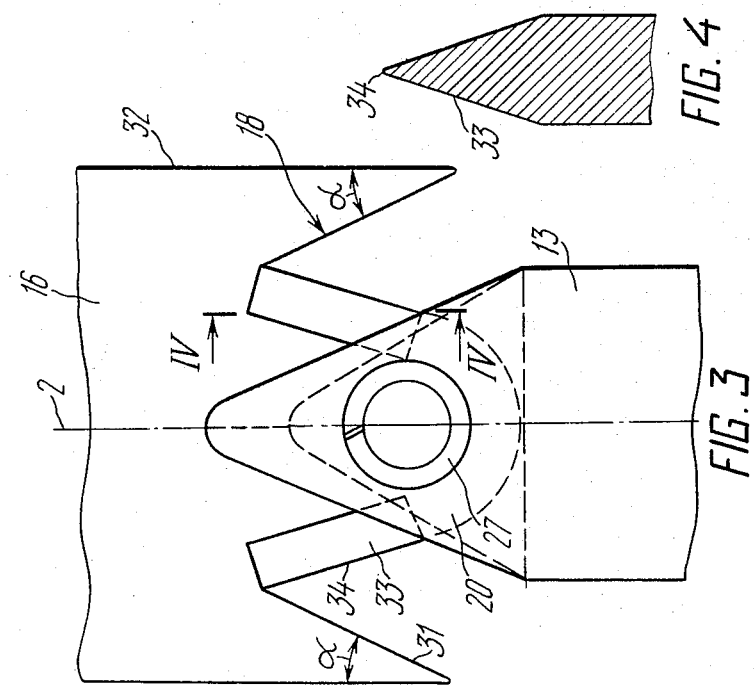
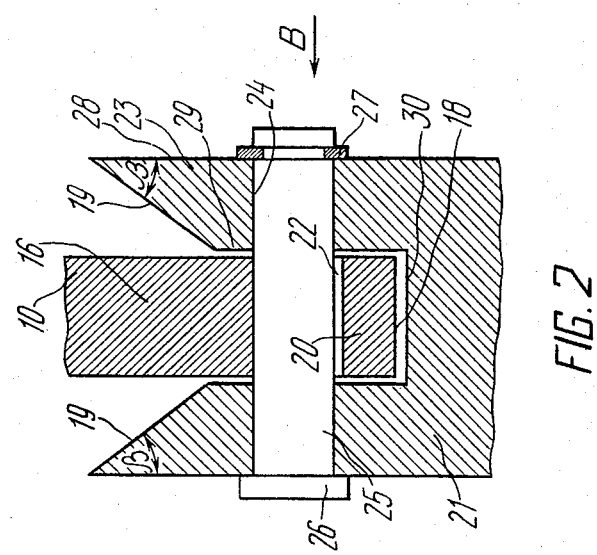

GATE VALVE

This invention relates generally to equipment for hydraulic and pneumatic pipe transport systems, and more particularly to a gate valve.

A gate valve embodying the present invention can find application in pipelines intended to convey loose materials containing high amounts of solid abrasive particles, especially to transport slurries in pipes.

The device according to the invention can also be used for transporting various materials in the mining, construction, chemical and other industries by pipe-transporting fluid suspensions of solid particles.

There is known a gate valve comprising a housing with branch pipes for connection to a pipeline to form therewith a straight-flow passage for a fluid to be conveyed therealong (cf., e.g., the article by L. Kotsany and G. Maurer entitled "Pipe Feeder for Hydraulic Pipe Transport Systems" published in the West German Magazine "Gluckauf" No. 24, 1072, pp. 41–50).

The housing of the above gate valve is arranged substantially vertically and has at the lower portion thereof a semispherical cover plate, the upper portion of the housing being enclosed by a flat cover plate.

The branch pipes of the housing of the above gate valve are connectable by their flanges to the pipeline such that the longitudinal centerline of the pipeline is perpendicular to the vertical central axis of the housing, the branch pipes being partially disposed inside the housing.

The ends of the branch pipes arranged opposite each other inside the housing comprise valve seats in alignment with the straight-flow passages.

Each valve seat is integral with a plurality of flat plates arranged perpendicularly relative to the straight-flow passage in line with the vertical axis of the housing. End faces of the valve seats projecting from the branch pipes are in opposition to each other at the level with the ends of the flat plates.

The housing also accommodates a gate member arranged in line with the vertical axis of the housing to enter a space between the two valve seats, the gate member having a hole for the solid particles suspended in a fluid being conveyed to pass therethrough.

During a closed position of the straight-flow passage the gate member is caused to be pressed against the valve seat to thereby block the straight-flow passage of the pipeline.

Disposed further in the housing for part of their length coaxially on both sides of the longitudinal centerline of the branch pipes are upper and lower rods, the lower rod being kinematically linked with a drive means for imparting reciprocating motions to the gate member to open close the straight-flow passage.

The drive means is generally a hydraulically-operated power cylinder having upper and lower connection holes for feeding a hydraulic fluid under pressure, the above rods extending inside the housing in line with the vertical axis of the housing through openings in the lower and upper cover plates, the rods being pressure-sealed against leaks by sealing rings.

Ends of the gate member furthest from the longitudinal centerline of the branch pipes are connected to the ends of the rods adjacent thereto, the ends of the gate member being substantially flat, areas of the gate member taken in sections perpendicular to the vertical axis of the housing being greater than areas of the rods taken in a similar manner.

The surfaces of the valve seats and those of the flat plates are accurately matched with the respective surfaces of the gate member to tightly fit thereagainst and thereby provide hermeticity between the straight-flow passage and the hole in the gate member.

The accurate fitting of the valve seat surfaces and the flat plates with respect to the gate member surfaces engageable therewith involves high manufacturing costs.

Penetration of solid particles (which are very often abrasive) to the interior of the housing is prevented by the flat plates adjacent to the gate member surfaces.

However, prolonged operation of the gate valve results in wear of the flat plates whereby solids tend to penetrate into the interior of the housing to settle down and accumulate therein, which in turn hampers reciprocating motions of the gate, i.e. the gate eventually fails to completely open and close the straight-flow passage.

Such a failure of the gate to completely open and close the straight-flow passage is especially pronounced when most of the interior of the gate valve housing is filled with solid particles, which requires periodic flushing of the interior of the housing with water supplied thereinto under a pressure in excess of the pressure of fluid being conveyed through the pipeline.

Flushing the interior of the housing affects the efficiency of the gate valve since this operation requires the use of an additional pipeline and a high pressure water pump.

Flushing the aforedescribed valve gates is especially complicated on main pipelines when the gate valves are separated by distances of tens of kilometers.

It is an object of the invention to provide a gate valve for a pipeline having a gate and gate drive rods of such a construction as to enable in the course of reciprocating movement of the gate the passage of solid particles accumulated in the interior of the gate valve housing from a space partially occupied by the gate to a space being left by the adjacent rod, and from a space occupied by the other of the two rods to a space being left by a portion of the gate adjacent thereto.

This object id accomplished by that in a gate valve comprising a housing having butt pipes for connection to a pipeline to form therewith a straight-flow passage and a gate having a hole therein for a fluid containing suspended solid particles to pass therethrough, the gate being engageable with at least one of the butt pipes for shutting-off this butt pipe and connected at its ends remote from a longitudinal centerline of the butt pipes to ends of rods of a drive means for imparting reciprocations to the gate to thereby open and shut-off the straight-flow passage, the rods being disposed inside the housing for a part of their length on either side of the longitudinal centerline of the butt pipes, according to the invention, the gate and each of the rods have equal areas taken in cross-sections perpendicular to a vertical axis of the rods, the ends of the gate and the ends of the rods having shaped end faces opposite to each other which are designed to facilitate the passage inside the housing of solid particles contained in the fluid being conveyed during reciprocations of the gate from a space partially occupied by the gate to a space being left by the adjacent rod, and from a space occupied by the other of the two rods to a space being left by a portion of the gate adjacent thereto.

By virtue of the foregoing arrangement the gate is capable of easy displacements throughout extended operating life of the gate valve during conveying fluids containing high amounts of solids, even when such solids occupy the entire interior of the gate valve housing.

Preferably, the connection of the ends of the gate to respective ends of the rods is effected by means of a lug provided at each end of the gate and a fork provided at the corresponding ends of each rod, the shaped end face of each end of the gate having a portion adjacent to a side surface of the gate to form therewith an acute angle in a longitudinal section taken transversely of the direction of the fluid flow, and portions between the lugs and the above firstmentioned portion of the shaped end face of the gate having in a longitudinal section taken in line with the direction of the fluid flow the shape of a wedge with an apex thereof facing the longitudinal centerline of the straight-flow passage, the shaped end face of the end of each rod defining a side surface of each jaw of the fork making with a generatrix of the side surface of the rod in a longitudinal section passing in line with the direction of the fluid flow an acute angle, lines tangent to the shaped end face of the end of each rod making therebetween an acute angle in a longitudinal section taken transversely of the direction of the fluid flow.

The above arrangement of the end faces of the gate and the rod ends connected to the gate provide for free movement of solid particles settled inside the housing during reciprocating motions of the gate from a volume partially occupied by the gate to a volume relieved by the adjacent rod. Simultaneously, the solids settled in the housing tend to pass from a volume occupied by the other rod to a volume relieved by a portion of the gate adjacent to this rod.

A gate valve embodying the present invention provides reliable closing and opening of a pipeline and offers long service life when operated with fluids containing high amounts of abrasive solids.

The gate valve embodying the present invention is intended predominantly for use in slurry pipe transportation.

These and other advantages of the invention are disclosed in greater detail in a description of preferred embodiments thereof that follows taken in conjunction with the accompanying drawings in which:

FIG. 2 is an enlarged view of section A in FIG. 1;

FIG. 3 is an enlarged view taken along the arrow B in FIG. 2;

FIG. 4 is a section taken along the line IV—IV in FIG. 3;

The gate valve embodying the present invention is intended predominantly for use in slurry pipe transportation.

Figure 1:
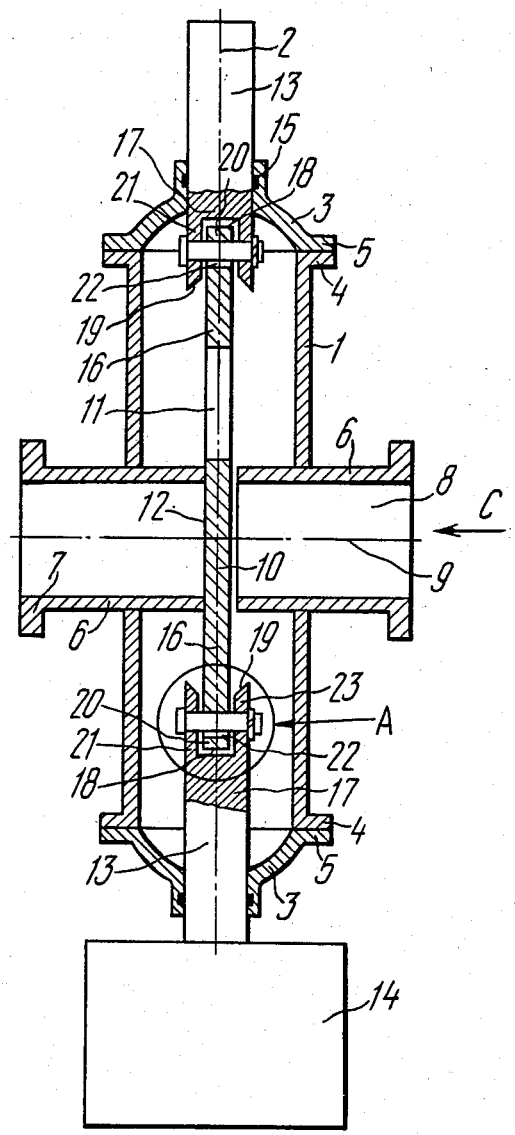
FIG. 1 is a longitudinal sectional view of a gate valve embodying the present invention.

With reference to FIG. 1, the gate valve comprises a housing 1 of cylindrical shape having a vertical longitudinal axis 2. The housing 1 is enclosed at the upper and lower ends by lids 3 of semispherical shape attached to flanges 4 of the housing 1 by their mating flanges 5.

The housing 1 has butt pipes 6 made integral therewith and serving for connection to a pipeline (not shown) by its flanges 7 to form with the pipeline a straight-flow passage 8 for a fluid to be conveyed therethrough in a direction indicated by the arrow C.

A longitudinal centerline 9 of the passage 8 is substantially perpendicular to the vertical longitudinal axis 2 of the housing 1 and is also the longitudinal centerline of the two butt pipes 6.

The butt pipes 6 extend inside the housing 1 for part of their length.

Accommodated inside the housing 1 between the butt pipes 6 in line with the vertical longitudinal axis 2 of the housing 1 is a gate 10.

The gate 10 has a hole 11 for the passage of a fluid, such as a liquid carrying suspended solid particles therethrough.

When the straight-flow passage 8 is closed, the gate 10 firmly contacts by its face 12 the left-hand butt pipe 6 as best seen in FIG. 1 and therefore closes this butt pipe 6. The gate 10 is spaced a certain distance from the right-hand butt pipe 6.

Disposed also for a part of their length inside the housing 1 are rods 13 arranged in line with the vertical longitudinal axis 2 on both sides of the longitudinal centerline 9 of the butt pipes 6. The rods 13 are kinematically linked with a drive means 14 providing for reciprocations of the gate 10 to effect closing and opening of the straight-flow passage 8.

Alternatively, each rod 13 may have a separate drive means.

The drive means 14 is of any known suitable design not to be described hereinafter for the sake of clarity. The rods 13 are adapted to extend to the interior of the housing 1 through bores (not indicated by reference numerals) made in the lids 3 in line with the vertical axis 2 of the housing 1. The rods 13 are packed against leaks relative the lids 3 by sealing rings 15. Opposite ends 16 of the gate 10 are connected to adjacent ends 17 of the rods 13; the connection between the ends 16 and 17 is to be described later in the description.

The gate 10 and each of the rods 13 have equal cross-sectional areas taken perpendicularly to the vertical axis 2, each rod 13 being essentially round and the gate 10 being rectangular in cross-section. The ends 16 of the gate 10 have shaped end faces 18, while the ends 17 of the rods 13 have shaped end faces 19. The shaped end faces 18 and 19 oppose each other and are arranged such that solid particles of the fluid being conveyed are capable of free passage inside the housing 1 in the course of reciprocations of the gate 10 from a volume partially occupied thereby to a volume released by the adjacent rod 13, as well as from a volume occupied by the other rod 13 to a volume relieved by the adjacent portion of the gate 10. As has been mentioned earlier, the gate 10 and each of the two rods 13 have equal cross-sectional areas. Thanks to the aforedescribed, complete passage of all solid particles carried by the fluid is facilitated between the two said volumes, which in turn aids in the movement of the gate 10.

Connection of the ends 16 of the gate 10 to the corresponding ends 17 of the rods 13 is effected by means of a lug 20 provided at each end 16 of the gate 10 and a fork 21 provided at the respective ends 17 of each rod 13.

The lug 20 of each end 16 of the gate 10 has a hole 22 the axis of which is parallel with the longitudinal centerline 9.

The fork 21 has two jaws 23 in which there are provided two drillings 24 (FIG. 2). Axes of the drillings 24 are close to coinciding with the axis of the hole 22 when the ends 16 of the gate 10 are connected to the ends 17 of the rods 13. Said ends 16 and 17 are interconnected by means of a pin 25 having a head 26 at one end and a clip ring 27 at the other end thereof.

A certain amount of setting clearance (not indicated by a reference character) is allowed between the pin 25 and the walls of the hole 22 of the gate 10.

The jaws 23 of the fork 21 are parallel with the axis 2.

Outer surfaces 28 of the jaws 23 are cylindrical and integral with the outer surface of each rod 13, whereas inner surfaces 29 of the jaws 23 which face the ends 16 of the gate 10 are planar.

Clearances (not indicated by reference characters) are provided between each end 16 of the gate 10 and the inner surfaces 29 of the jaws 23, as well as between each end 16 of the gate 10 and a surface 30 connecting the inner surfaces 29 of the jaws 23.

With reference to FIG. 3, the shaped end face 18 of each end 16 of the gate 10 has a portion 31 adjacent to a side surface 32 of the gate 10.

The portion 31 defines with the side surface 32 an acute angle $\alpha$ if viewed in a longitudinal section parallel with the surface 12 of the gate 10.

This makes it possible for the solids occupying the interior of the housing to travel along the portion 31 of the end face 18 during displacement of the gate 10, which will be elaborated in greater detail when operation of the gate valve according to the invention is described.

The end face 18 of each end 16 of the gate 10 also has portions 33 interposed between the lug 20 and the portion 31.

In a longitudinal section perpendicular to the face 12 of the gate 10 these portions 33 are wedge-shaped as seen best in FIG. 4, their apexes 34 facing the adjacent rod 13.

The heretofore described arrangement of the end face 18 of each end 16 of the gate 10 provides for a free passage of solids during displacements of the gate 10.

Figure 5:
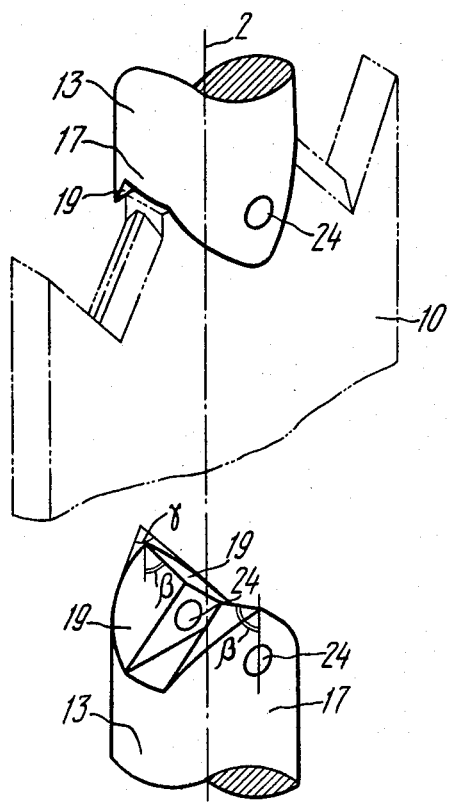
FIG. 5 is a schematic axonometric illustration by solid lines of ends of gate rods for connection to ends of a gate member, dash-dot lines showing the upper end of the gate member.

Referring now to FIG. 5, the shaped faces 19 of the end 17 of each rod 13 define side surfaces of the jaws 23 of the fork 21.

The shaped end face 19 of each end 17 of the rod 13 defining the side surfaces of each jaw 23 makes with the generating line of the side surface of the rod 13 an acute angle $\beta$ if viewed in a longitudinal section taken perpendicularly to the face 12 of the gate 10.

Therewith, lines tangent to this shaped end face make an acute angle $\gamma$ if viewed in a longitudinal section parallel with the face 12 of the gate 10.

Such an arrangement of the jaws 23 of the fork 21 serves to further facilitate the free travel of solids inside the housing 1.

The gate valve embodying the present invention operates as follows.

Upon engagement of the drive means 14 the rods 13 kinematically linked therewith initiate their reciprocating motion along the vertical axis 2.

The lower rod 13 imparts movement of the gate 10 via the pin 25 tightly fitted in holes 24 of the jaws 23 of the fork 21 and received loosely in the hole 22 of the lug 20 whereby the gate 10 is caused to move along the vertical axis 2.

While being displaced along the vertical axis 2 the gate 10 also imparts movement to the upper rod 13 (FIG. 1), this movement being transmitted through the pin 25 engageable with the fork 21 of the upper rod 13 and the upper lug 20 of the gate 10.

Upon the movement of the rods 13 the face 12 of the gate 10 displaces relative to the left-hand butt pipe 6 (FIG. 1).

Thereafter, the hole 11 of the gate 10 is put in registration with the direct-flow passage 8 to ensure complete opening of the passage 8 when the axis of the hole 11 is in complete alignment with the longitudinal centerline 9 of the passage 8.

Concurrently, the end face 18 of the lower end 16 of the gate 10 and the end face 19 of the end 17 of the rod 13 are drawn nearer to the lower lid 3 (FIG. 1) of the housing 1, whereas the respective end faces 18 and 19 of the upper end 16 of the gate 10 and the end 17 of the upper rod 13 depart from the upper lid 3 of the housing 1.

Figure 6:
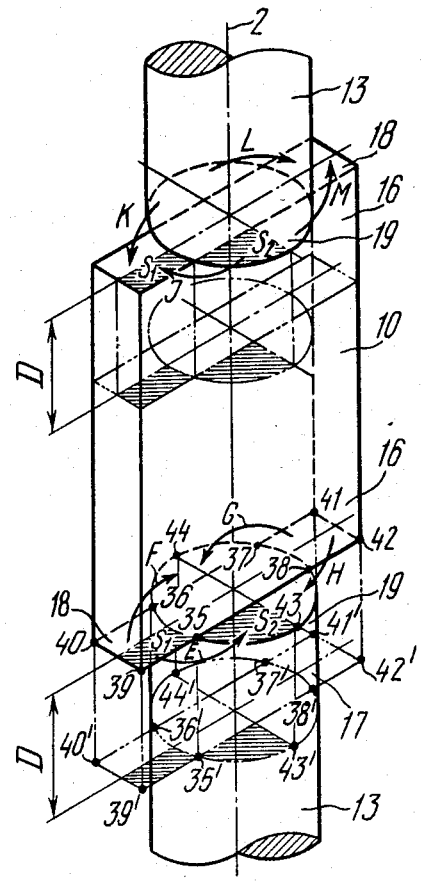
FIG. 6 shows schematically by solid lines the gate member and the rods in their initial position, the dash-dot lines showing the gate member and the rods in an intermediate position during their downward movement.

Referring now to FIG. 6, the gate 10 and the rods 13 assume a position shown in this figure by solid lines prior to executing movements described heretofore.

After executing a downward movement at a distance indicated by D (FIG. 6), the gate 10 and the rods 13 assume a position shown in FIG. 6 by dash-dot lines.

Therewith, the lower rod 13 will release a volume equal to a product of the cross-sectional area of the lower rod 13 and the distance D of displacement.

To ensure a free movement of the gate 10, it is necessary that solid particles be removed from under the lower end 16 of the gate 10, these solid particles occupying a volume equal to a product of the cross-sectional area of the gate 10 and the distance D of displacement.

Because the cross-sectional areas of the gate 10 and each of the rods 13 are equal, the above volume occupied by the solid particles is likewise equal to the volume relieved by the rod 13.

Therefore, the movement of the lower rod 13 ensures the provision of a volume for the solid particles which is equal to the volume occupied by the gate 10 during its downward movement.

In a likewise manner a volume is provided near the upper end 16 of the gate 10 which is equal to the volume occupied by the upper rod 13 during its downward movement.

The end surfaces 18 of the gate 10 have areas common with the end surfaces 19 of the rods 13, these areas being confined by points 35, 36, 37 and 38.

A volume relieved by the rod 13 during its downward movement is occupied by the body of the gate 10.

To ensure unobtrusive movement of the gate 10 downwards solid particles occupying volumes confined by points 35, 36, 35', 36', 39, 40, 39', 40' and points 37, 38, 37', 38', 41, 42, 41', 42' are caused to pass into volumes relieved by the lower rod 13 as shown in FIG. 6 by points 35, 38, 43, 35', 38', 43' and 36, 37, 44, 36', 37', 44'.

The shaped configuration of the end face 18 of each end 16 of the gate 10 provides for the passage of solid particles from under the end face 18 of the lower end 16 of the gate 10 to the volumes relieved by the lower rod 13 in directions indicated by the arrows E, F, G and H.

For the sake of clarifying the abovementioned passage of the solids, the arrow E shows the path of travel of such solids from the volume of a prism having a base area indicated by $S_1$ and height D an equal volume of a cylinder having a height D and base area indicated by $S_2$ which is substantially the same as the area $S_1$, the two base portions having areas $S_1$ and $S_2$ being hatched.

The aforedescribed takes place due to the fact that during lowering of the end face 19 of the end 17 of the upper rod 13 into a bed of settled solids the latter tend to travel along portions 31 thanks to the acute angle α between a side surface 32 (FIG. 3) of the gate 10 and the portion 31 toward the longitudinal vertical axis 2 to thereby get closer to the volume relieved by the lower rod 13.

Along the path of their travel the solid particles run against the intermediate portions 33 having in a longitudinal section the shape of a wedge with an apex at 34.

The apex 34 separates the solid particles into two equal flows which are directed by the portions 33 toward the volumes having the base area indicated by $S_2$ in FIG. 6.

In this manner the solid particles pass inside the housing 1 to occupy the volumes relieved by the lower rod 13 from under the end face 18 of the lower end 16 of the gate 10, which facilitates the unobtrusive movement of the gate 10 downwards.

During the downward movement of the gate 10 the end face 18 of its upper end 16 and the end face 19 of the end 17 of the upper rod 13 pass through the distance D from the position shown in FIG. 6 by a solid line to the position indicated by a dash-dot line.

Due to the equality of the cross-sectional areas of each rods 13 and the gate 10 the volume relieved by the gate 10 is equal to the volume occupied by the solid particles under the end face 19 of the end 17 of the upper rod 13.

From under the end face 19 of the end 17 of the upper rod 13 the solid particles tend to follow paths indicated in FIG. 6 by the arrows J, K, L and M.

This movement of the solids occurs by virtue of the fact that the shaped end face 19 of the end 17 of the upper rod 13 defining the side surface of each jaw 23 of the fork 21 makes relative to the generatrix of the side surface of the rod 13 the acute angle β in a longitudinal section of the rod 13 passing in line with the direction of the fluid flow indicated by C, whereas the lines tangent to the shaped end face 19 of the end 17 of each rod 13 make therebetween the angle γ (FIG. 5) in a longitudinal section transverse to the flow direction indicated by A.

Thanks to the inclination of the side surfaces of the shaped end face 19 of each jaw 23 of the fork 21 at the angle β, the solids tend to pass from the periphery of the rod 13 in a direction toward the vertical longitudinal axis 2.

The inclination of the lines tangent to said surfaces to define therebetween the angle γ in a longitudinal section transverse to the flow direction indicated by A facilitates the passage of solids toward the side surfaces 32 of the gate 10.

Concurrently, the provision of the angles β and γ ensures the passage of solids in the direction indicated by the arrows J, K, L and M from under the shaped end face 19 of the end 17 of the upper rod 13 (FIG. 6), the solids thus passing from the volumes having the base areas indicated by $S_2$ to the volumes having the base areas $S_1 = S_2$ relieved in the course of the downward movement of the gate 10. The passage of solids from under the shaped end face 19 of the end 17 of the upper rod 13 (FIG. 6) to the volumes relieved by the gate 10 facilitates easy movement of the upper rod 13.

The movement of solids from under the shaped end face 18 of the lower end 16 of the gate 10 to the volume relieved by the lower rod 13 and simultaneous travel of solids from under the shaped end face 19 of the end 17 of the upper rod 13 (FIG. 6) to the volume being relieved by the gate 10 promotes easy opening of the straight-flow passage 8.

When the rods 13 and the gate 10 are moved upwards, the face 12 of the gate 10 comes into contact with the left-hand butt pipe 6 (FIG. 1) to be pressed thereagainst by the flow of fluid being conveyed in the direction indicated by C.

The provision of clearances between the holes 22 in the lugs 20 and the pins 25, as well as the spacings between each end 16 of the gate 10 and the inner surfaces 29 of the jaws 23 and the inner surface 30 between these inner surfaces 29 enable the face 12 of the gate 10 to tightly fit against the end face of the left-hand butt pipe 6 as best seen in FIG. 6, which ensures hermetic blocking of the straight-flow passage 8.

During the upward movement of the gate 10 and the rods 13 solids travelling along their end faces 18 and 19 tend to pass to the volumes being relieved.

Therewith, solid particles passing through the shaped end face 18 of the upper end 16 of the gate 10 move to the volume being relieved by the upper rod 13, while from under the shaped end face 19 of the end 17 of the lower rod 13 (FIG. 1) the solid particles are forced into the volume relieved by the gate 10, the solids being moved in a manner similar to what has been described with reference to the downward movement of the gate 10 and the rods 13.

The aforedescribed provides for a reliable movement of the gate even when the housing 1 of the gate valve is filled with a large amount of solid particles.

A pilot model of the gate valve embodying the present invention has been manufactured and successfully passed tests when operated with coal slurries containing high concentrations of solid particles.

In view of the foregoing, the proposed gate valve provides reliable opening and closing of slurry pipes.

We claim:

1. A gate valve for a pipeline, comprising: a housing; butt pipes of said housing for being connected to said pipeline for forming a straight-flow passage therewith; a gate arranged inside said housing and having a hole for the passage therethrough of a fluid being conveyed in the form of a suspension of solid particles and a surface engageable with at least one of said butt pipes for shutting-off the butt pipe; a drive for imparting reciprocations to said gate for opening and shutting-off the straight-flow passage; rods of said drive arranged coaxially on either side of the centerline of said butt pipes and accommodated inside said housing for a part of their length; ends of said rods adjacent to said gate; the ends of said gate remote from the axis of said butt pipes being connected to said ends of said rods; said gate and each of said rods having equal areas in cross-sections perpendicular to the axis of said rods; said gate having at said ends thereof, and each of said rods having at said ends thereof, shaped end faces facing toward each other which are designed for the passage of solid particles of a fluid being conveyed during the reciprocations of said gate from a space partially occupied by said gate to a space being left by one of said rods adjacent thereto, and also from a space occupied by the other of said rods to a space being left by the part of said gate adjacent thereto.

2. A gate valve for a pipeline according to claim 1, wherein said ends of said gate are connected to said ends of said rods by means of lugs provided at each of said ends of said gate and a fork provided at a respective end of each of said rods; the shaped end face of each of said ends of said gate having a portion adjacent to a side surface of said gate and being inclined thereto at an acute angle in the longitudinal section taken transversely of the direction of flow, and portions extending between the lug and said portion adjacent to the side surface having in the longitudinal section taken along the direction of flow of a fluid being conveyed the shape of a wedge with an apex facing toward the longitudinal centerline of said passage; the shaped end face of each of said ends of said rods defining the side surface of each jaw of the fork making an acute angle with a generatrix of the side surface of each of said rod in a longitudinal section taken along the direction of flow of a fluid being conveyed; and lines tangent to the shaped end face of each of said ends of each of said rods in a longitudinal section taken transversely of the flow of a fluid being conveyed making therebetween an acute angle.

* * * * *